(12) United States Patent
Allen

(10) Patent No.: US 11,433,993 B2
(45) Date of Patent: Sep. 6, 2022

(54) ELECTROMECHANICAL ACTUATOR PUMP

(71) Applicant: GOODRICH CORPORATION, Charlotte, NC (US)

(72) Inventor: Jason Bradley Allen, Waco, TX (US)

(73) Assignee: Goodrich Corporation, Charlotte, NC (US)

( * ) Notice: Subject to any disclaimer, the term of this patent is extended or adjusted under 35 U.S.C. 154(b) by 223 days.

(21) Appl. No.: 16/676,703

(22) Filed: Nov. 7, 2019

(65) Prior Publication Data
US 2021/0140539 A1 May 13, 2021

(51) Int. Cl.
| | |
|---|---|
| B64C 25/50 | (2006.01) |
| B62D 5/04 | (2006.01) |
| F16H 61/02 | (2006.01) |
| F16H 61/28 | (2006.01) |
| F16H 57/02 | (2012.01) |
| B64C 25/26 | (2006.01) |
| B64C 25/22 | (2006.01) |
| F16D 48/02 | (2006.01) |

(52) U.S. Cl.
CPC ............ B64C 25/50 (2013.01); B62D 5/043 (2013.01); F16H 61/0206 (2013.01); F16H 61/2807 (2013.01); *B64C 25/22* (2013.01); *B64C 25/26* (2013.01); *F16D 2048/0203* (2013.01); *F16H 2057/02034* (2013.01)

(58) Field of Classification Search
CPC . B64C 25/50; B64C 25/26; F16D 2048/0203; B64D 5/043
See application file for complete search history.

(56) References Cited

U.S. PATENT DOCUMENTS

| | | | |
|---|---|---|---|
| 2016/0101849 A1* | 4/2016 | Liegeois | B64C 25/505 244/50 |
| 2016/0124428 A1 | 5/2016 | Nutaro et al. | |
| 2017/0057624 A1* | 3/2017 | Lo | B60T 8/1703 |
| 2018/0208299 A1* | 7/2018 | Hinderhofer | B64C 13/24 |

FOREIGN PATENT DOCUMENTS

| | | |
|---|---|---|
| DE | 202016002479 | 8/2016 |
| EP | 0417283 | 3/1991 |
| EP | 2236419 | * 10/2010 |
| EP | 3241744 | 11/2017 |

OTHER PUBLICATIONS

European Patent Office, European Partial Search Report dated Apr. 8, 2021 in Application No. 20206488.7.
European Patent Office, European Search Report dated Jul. 14, 2021 in Application No. 20206488.7.

* cited by examiner

*Primary Examiner* — Philip J Bonzell
*Assistant Examiner* — Ashesh Dangol
(74) *Attorney, Agent, or Firm* — Snell & Wilmer L.L.P.

(57) ABSTRACT

A nose landing gear system is disclosed. In various embodiments, the nose landing gear system includes an electric motor; a hydraulic pump connected to the electric motor; a gearbox connected to the electric motor; and a clutch configured to mechanically couple the gearbox to a steering collar.

16 Claims, 9 Drawing Sheets

ELECTROMECHANICAL ACTUATOR PUMP

FIELD

The present disclosure relates generally to landing gear systems and, more particularly, to electric nose landing gear systems.

BACKGROUND

Aircraft often contain numerous hydraulic systems including, for example, hydraulic systems typically used for the nose and main landing gear systems. The hydraulic pumps for such systems are typically centralized and located aft of the nose region. Transporting pressurized hydraulic fluid from the aft portions of the aircraft to the nose region often involves long networks of hydraulic tubes. The tubes run from near the engines, where pumps provide hydraulic fluid flow using engine power or electrical power provided from an auxiliary source, to the nose of the aircraft, where the pressurized fluid is used to power and steer the nose landing gear.

As a result of the long tubing networks of centralized hydraulic systems, the aircraft carries a large volume of hydraulic fluid to fill the hydraulic tubes used for both supply and return. Carrying extra fluid equates to carrying extra weight and thereby decreases aircraft efficiency. Additionally, the hydraulic tubes occasionally develop leaks over the life of the aircraft. Leaks in the tubing are fixed using labor intensive processes to locate the leak, access the tubing, and replace the tubing. Reducing the potential for leak points is therefore desirable.

With regard to the landing gear actuation systems, centralized hydraulic systems are relatively inefficient since the hydraulic systems and components must be sized to provide a relatively large pressurized flow rate for the landing gear actuation systems for short periods of time in addition to continually providing flow to other systems. Landing gear actuation systems generally operate only twice during a flight cycle, that is, before landing and after take-off. Attempts to reduce hydraulic tubing and therefore potential leak points include utilizing electric components in lieu of hydraulic components. One way this is accomplished is by generating hydraulic power locally via an electric motor-driven pump located within the nose landing gear bay. This hydraulic power is fed to a local independent hydraulic system within the nose landing gear bay that can drive a nose wheel steering motor as well as a nose landing gear door and uplock, downlock and retraction/extension actuators. Other attempts utilize a rotary electro-mechanical actuator (EMA) nose wheel steering unit in lieu of a hydraulic motor. Some attempts utilize an EMA for nose landing gear retraction/extension and other landing gear functions. However, use of an EMA as described may exhibit disadvantages. For example, the EMA does not handle over-running loads as easily as hydraulic actuators, and jamming failure modes are not easily addressed. Also, these concepts require more equipment (e.g., two motors) than optimally required.

SUMMARY

A nose landing gear system is disclosed. In various embodiments, the nose landing gear system includes an electric motor; a hydraulic pump connected to the electric motor; a gearbox connected to the electric motor; and a clutch configured to mechanically couple the gearbox to a steering collar.

In various embodiments, a clutch control valve is configured to engage and disengage the clutch. In various embodiments, the clutch control valve is fluidly coupled to a local accumulator which is pressurized by the nose landing gear system hydraulic pump. In various embodiments, the accumulator is configured to store hydraulic fluid at a specified pressure that is sufficient to engage or disengage the clutch. In various embodiments, the clutch is disposed between the gearbox and the steering collar.

In various embodiments, the hydraulic pump is configured for connection with a retract actuator or, in various embodiments, with one or more of uplock, downlock and door actuators. In various embodiments, a directional control valve is fluidly coupled to the hydraulic pump and to the retract actuator. In various embodiments, the directional control valve is configured to provide a recirculation hydraulic circuit when in a neutral position. In various embodiments, the recirculation hydraulic circuit is configured to fluidly couple a fluid outlet to a fluid inlet of the hydraulic pump via the directional control valve. In various embodiments, the fluid outlet of the hydraulic pump is fluidly coupled to a clutch control valve configured to engage and disengage the clutch and to the directional control valve.

A method of operating a nose landing gear system is disclosed. In various embodiments, the method includes driving an electric motor connected to a hydraulic pump and to a gearbox; circulating a hydraulic fluid within a recirculation hydraulic circuit via the hydraulic pump; and steering a nose wheel via the steering collar and the gearbox.

In various embodiments, circulating the hydraulic fluid within the recirculation hydraulic circuit includes circulating the hydraulic fluid through a fluid return provided by a directional control valve in a neutral position. In various embodiments, the method includes pressurizing an accumulator to a specified pressure that is sufficient to engage or disengage a clutch mechanically coupled to the gearbox and to the steering collar of the nose landing gear assembly.

In various embodiments, the method includes disengaging the clutch, switching the directional control valve to a stowed position and stowing the nose landing gear assembly via the hydraulic pump. In various embodiments, the method includes disengaging the clutch, switching the directional control valve to a deployed position and deploying the nose landing gear assembly via the hydraulic pump.

In various embodiments, the nose landing gear assembly steering collar is mechanically coupled to the gearbox via a clutch. In various embodiments, the clutch is fluidly coupled to a local accumulator configured for pressurization via the nose landing gear system hydraulic pump.

An electromechanical actuator for steering a nose landing gear system is disclosed. In various embodiments, the electromechanical actuator includes an electric motor; a gearbox connected to the electric motor; a clutch configured to mechanically couple the gearbox to a steering collar; and a clutch control valve fluidly coupled to the clutch and configured to receive pressurized hydraulic fluid from either a local accumulator or the nose landing gear system hydraulic system to engage or disengage the clutch with or from the steering collar. In various embodiments, an electrically actuated clutch with or without redundant coils is configured to operate the clutch in lieu of hydraulic pressure.

In various embodiments, the electric motor is configured to drive a hydraulic pump connected to the electric motor and the hydraulic pump is fluidly coupled with the nose landing gear system hydraulic system which includes one or more accumulators. In various embodiments, the electromechanical actuator includes a check valve configured for fluid coupling with a fluid outlet of the hydraulic pump so as to fluidly isolate the clutch control valve local accumulator from the rest of the nose landing gear system hydraulic system. This will allow pressure to be retained within this local accumulator even if there is a fluid line break upstream of the check valve.

The forgoing features and elements may be combined in various combinations, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
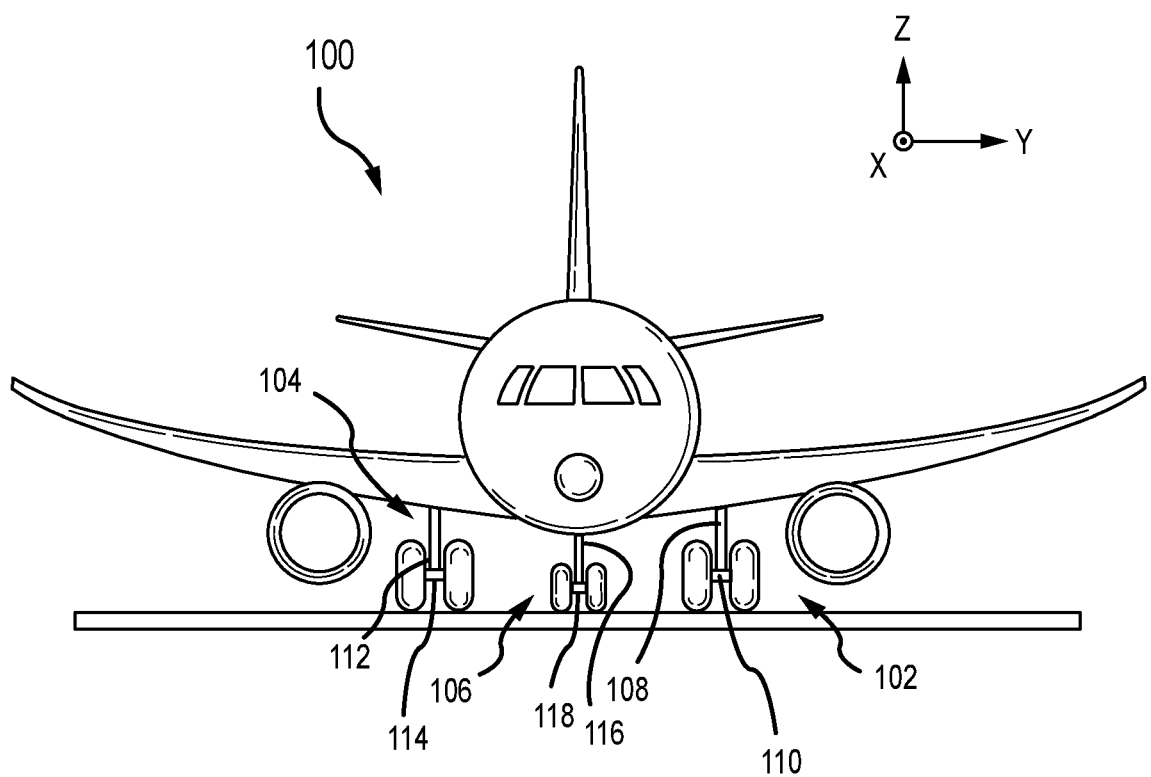
FIG. 1 illustrates an aircraft having a landing gear assembly and wheels mounted thereon, in accordance with various embodiments.

With reference to FIG. 1, an aircraft 100 is illustrated. In accordance with various embodiments, the aircraft 100 may include one or more landing gear systems, such as, for example, a left landing gear system 102 (or port-side landing gear system), a right landing gear system 104 (or starboard-side landing gear system) and a nose landing gear system 106. Each of the left landing gear system 102, the right landing gear system 104 and the nose landing gear system 106 may support the aircraft 100 when not flying, allowing the aircraft 100 to taxi, takeoff and land, safely and without damage to the aircraft. In various embodiments, the left landing gear system 102 may include a left landing gear assembly 108 that includes a left wheel assembly 110, the right landing gear system 104 may include a right landing gear assembly 112 that includes a right wheel assembly 114 and the nose landing gear system 106 may include a nose landing gear assembly 116 that includes a nose wheel assembly 118.

Figure 2:
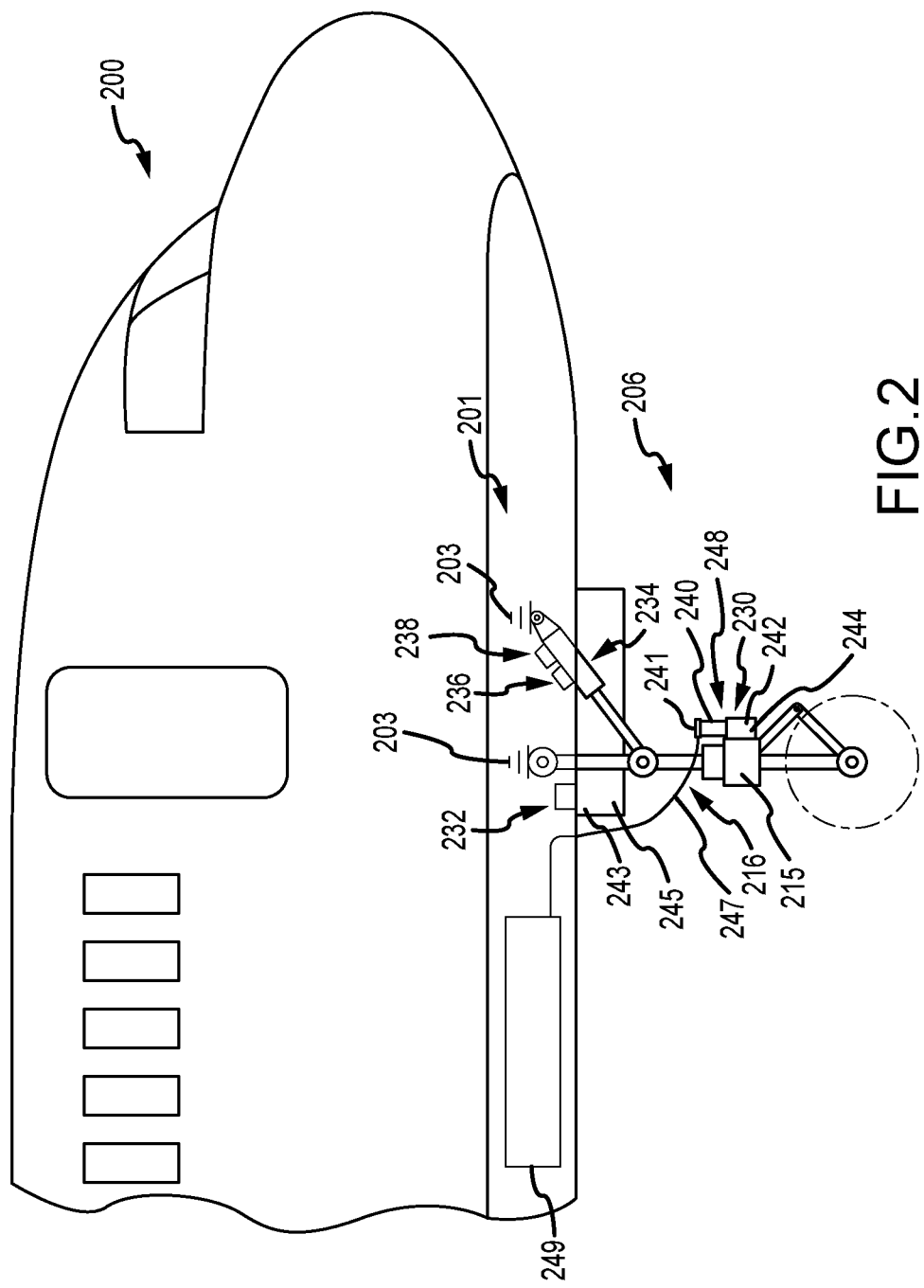
FIG. 2 illustrates mechanical components of an electric nose landing gear architecture, in accordance with various embodiments.

With reference to FIG. 2, an aircraft 200 having a nose landing gear system 206 configured for retraction and stowage within an interior bay section 201 (or a nose landing gear bay) of the aircraft is illustrated, in accordance with various embodiments. The nose landing gear system 206 includes a steering actuator 230, a door actuator 232 and a retract actuator 234. The nose landing gear system 206 may further include a downlock actuator 236 and an uplock actuator 238 which, in various embodiments, may be located internal to the retract actuator 234 or external to the retract actuator 234 and connected to a fixed structure 203 within the interior bay section 201. The steering actuator 230 is connected to a steering collar 215 that is itself connected to a nose landing gear assembly 216 and configured to steer the nose landing gear system 206. The steering actuator 230 comprises an electric motor 240, a gear box 242 configured to transmit power provided by the electric motor 240 to the steering collar 215 and a clutch 244. In various embodiments, the combination of the electric motor 240, the gear box 242 and the clutch 244 comprises an electromechanical actuator 248 connected to the steering collar 215 and configured to steer the aircraft 200. In various embodiments, the steering actuator 230 may also include a hydraulic pump 241 operably coupled to the electric motor 240. A power cable 247 provides electrical power from a power source 249 to the electric motor 240. In various embodiments, the power source 249 is disposed locally within the interior bay section 201 or is provided by a centralized electrical power system external to the interior bay section 201.

Still referring to FIG. 2, the door actuator 232 is connected to a door assembly 243 and configured to open and close a fairing door 245 of the door assembly 243 in order to provide access to the interior bay section 201 of the aircraft 200 for the nose landing gear system 206 to be stored when retracted. In various embodiments, the fairing door 245 may be slaved to the nose landing gear assembly 216 or to one or more other components of the nose landing gear system 206, obviating a need for the door actuator 232. The retract actuator 234 is connected to the nose landing gear assembly 216 and configured to raise and lower the nose landing gear assembly 216 into and out of, respectively, the interior bay section 201 of the aircraft 200.

Figure 3:
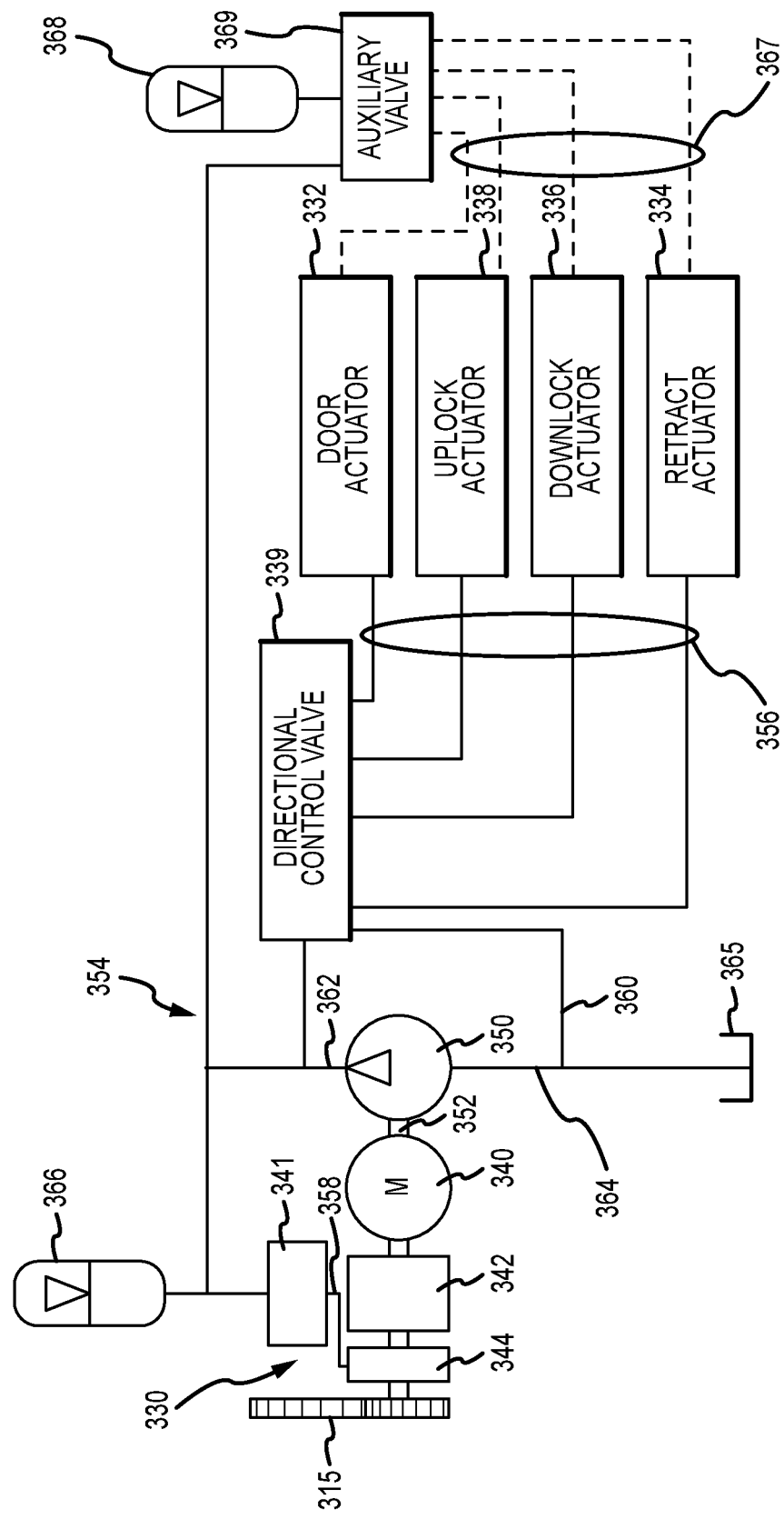
FIG. 3 illustrates a hydraulic and electric circuit configured to operate a nose landing gear system, in accordance with various embodiments.

Referring now to FIG. 3, a schematic diagram of a nose landing gear system 306, similar to the nose landing gear system 206 described above with reference to FIG. 2, is illustrated. The nose landing gear system 306 includes a steering actuator 330, a door actuator 332 and a retract actuator 334. The nose landing gear system 306 may further include a downlock actuator 336 and an uplock actuator 338 configured to lock a nose landing gear assembly, such as, for example, the nose landing gear assembly 216 described above with reference to FIG. 2, in a deployed position and a stowed position, respectively. In various embodiments, the downlock and uplock functions may be integrated or slaved into the retract actuator 334 itself. In various embodiments, the door actuator 332, the retract actuator 334, the downlock actuator 336 and the uplock actuator 338 are controlled via a directional control valve 339. The steering actuator 330 is connected to a steering collar 315 that is itself connected to the nose landing gear assembly and configured to steer a nose wheel and therefore the aircraft. In various embodiments, the steering actuator 330 comprises an electric motor 340, a gear box 342 configured to transmit power provided by the electric motor 340 to the steering collar 315 and a clutch 344 connected to a clutch control valve 341 configured to engage and disengage the clutch 344. In various embodiments, the combination of the electric motor 340, the gear box 342 and the clutch 344 comprises an electromechanical actuator 348 connected to the steering collar 315.

As described in more detail below, the directional control valve 339 and the clutch control valve 341 are fluidly coupled to a hydraulic pump 350. The hydraulic pump 350 is mechanically connected to the electric motor 340 via a shaft 352 and is fluidly connected to the directional control valve 339 and to the clutch control valve 341 via a network of hydraulic lines 354. The network of hydraulic lines 354 includes a plurality of actuator hydraulic lines 356 that fluidly couple the directional control valve 339 to the door actuator 332, the retract actuator 334, the downlock actuator 336 and the uplock actuator 338, a clutch hydraulic line 358 that fluidly couples the clutch control valve 341 to the clutch 344 and a recirculation hydraulic circuit 360 that fluidly couples a fluid outlet 362 to a fluid inlet 364 of the hydraulic pump 350 via the directional control valve 339. Also fluidly coupled to the network of hydraulic lines 354 is a first accumulator 366, a second accumulator 368 and a reservoir 365. In various embodiments, the network of hydraulic lines 354 also includes a plurality of auxiliary hydraulic lines 367 configured to fluidly couple the door actuator 332, the retract actuator 334, the downlock actuator 336 and the uplock actuator 338 to the second accumulator 368 via an auxiliary valve 369. In various embodiments, the first accumulator 366 and the clutch control valve 341 are integrated into the steering actuator 330, enabling the clutch hydraulic line 358 to also be integrated into the steering actuator 330 as an integrated fluid passageway.

Figure 4A:
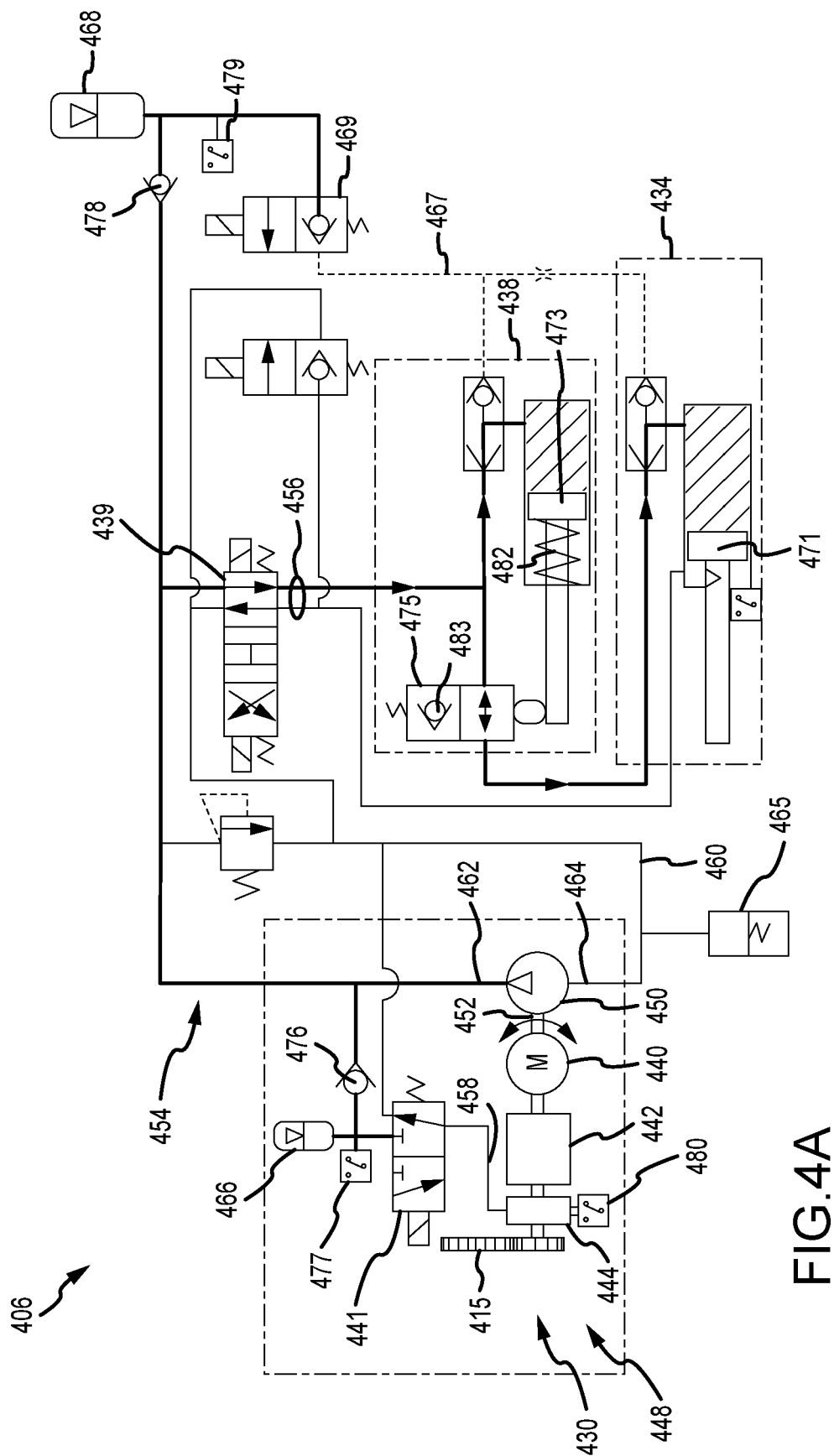
FIGS. 4A, 4B and 4C illustrate a hydraulic and electric circuit configured to operate a nose landing gear system, in accordance with various embodiments.
Figure 4B:
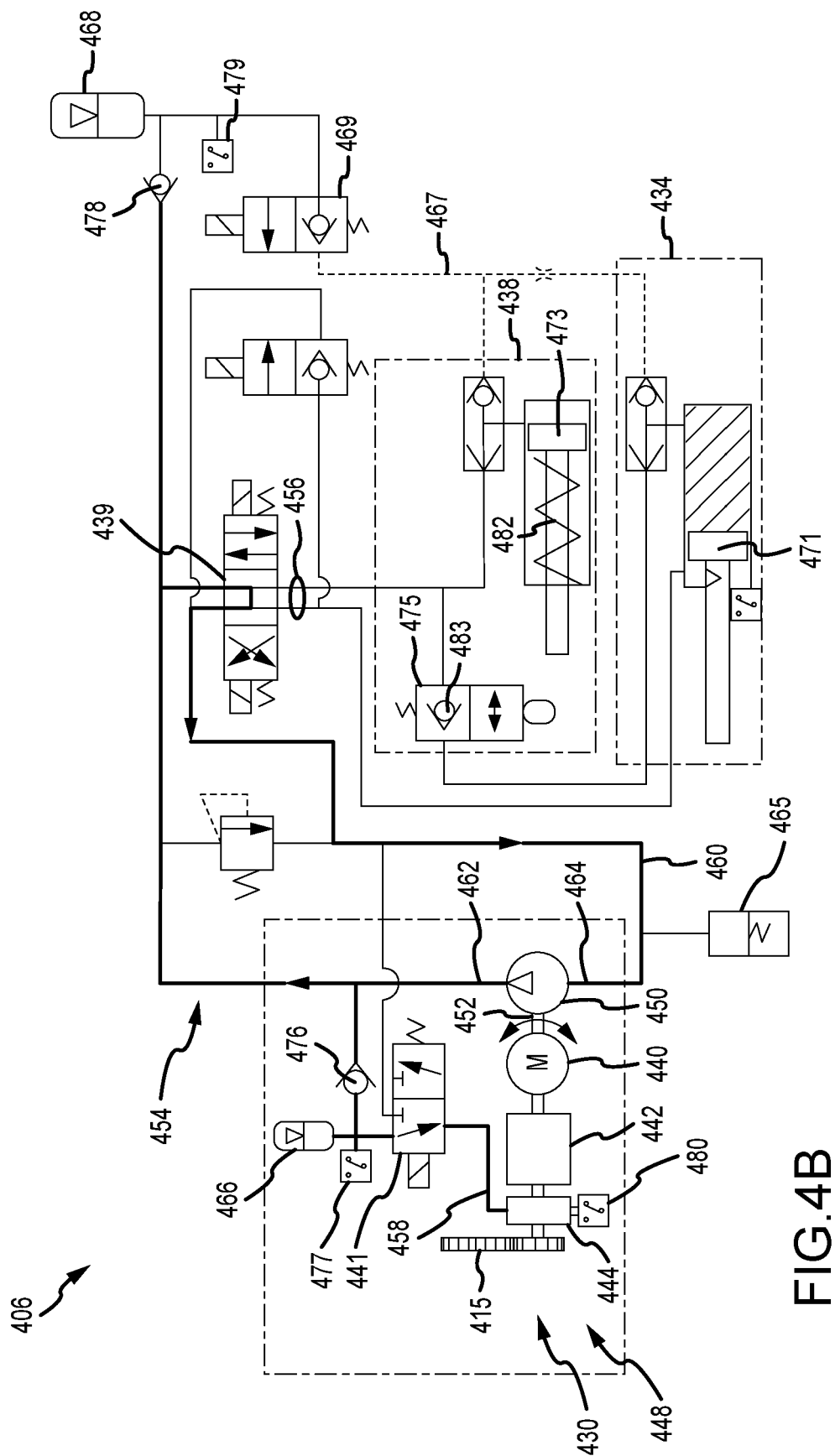
Figure 4C:
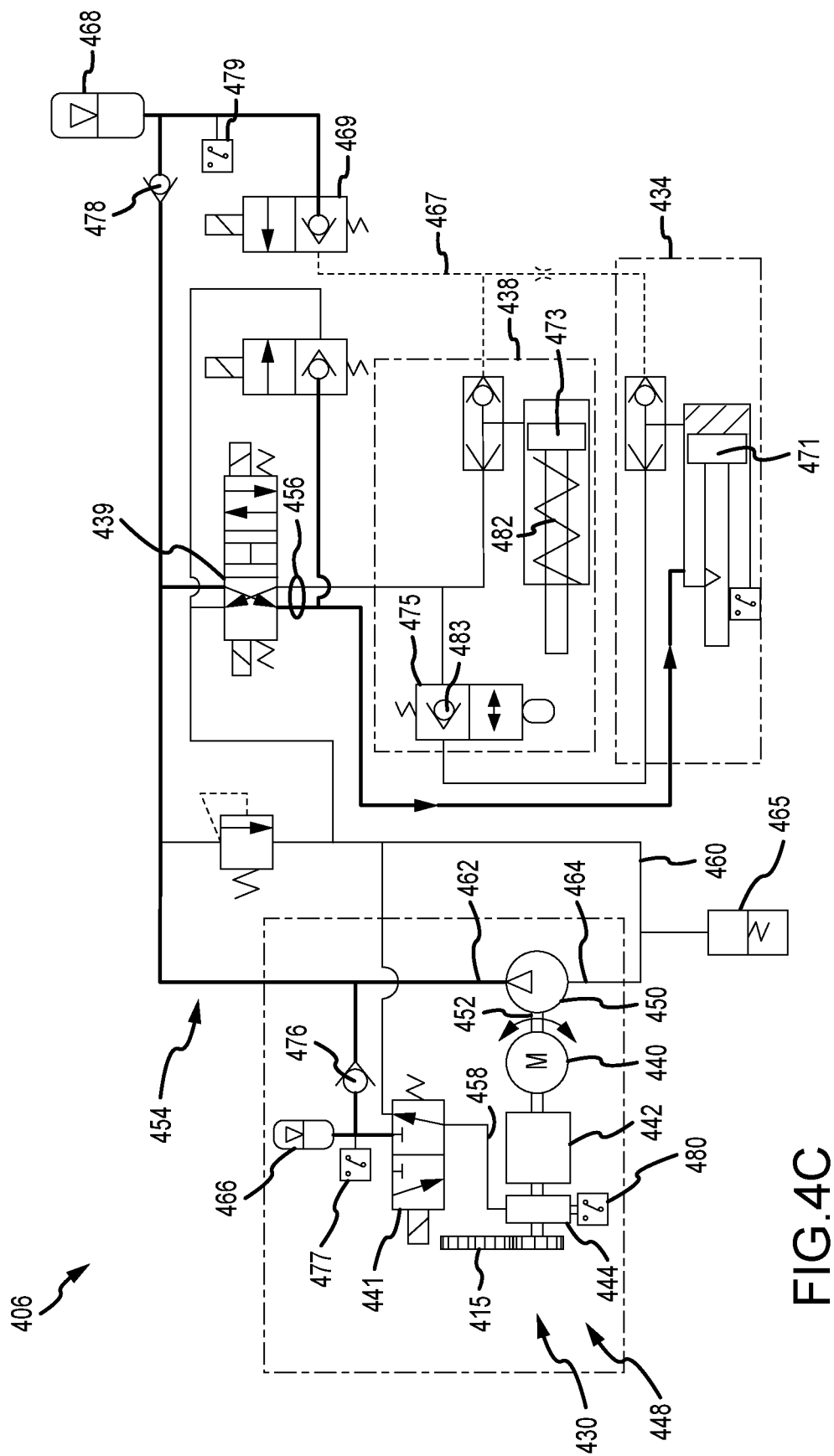

Referring now to FIGS. 4A, 4B and 4C, schematic diagrams of a nose landing gear system 406, similar to the nose landing gear system 206 described above with reference to FIG. 2 and the nose landing gear system 306 described above with reference to FIG. 3, are illustrated. The nose landing gear system 406 includes a steering actuator 430, a retract actuator 434 and an uplock actuator 438, similar to the steering actuator 330, the retract actuator 334 and the uplock actuator 338 described above with reference to FIG. 3. While not illustrated, the nose landing gear system 406 may also include a downlock actuator and a door actuator, similar to the downlock actuator 336 and the door actuator 332 also described above with reference to FIG. 3. In various embodiments, the retract actuator 434 and the uplock actuator 438 are controlled via a directional control valve 439, as illustrated in FIGS. 4B and 4C. The steering actuator 430 is connected to a steering collar 415 that is itself connected to a nose landing gear assembly, such as, for example, the nose landing gear assembly 216 described above with reference to FIG. 2, and configured to steer an aircraft. In various embodiments, the steering actuator 430 comprises an electric motor 440, a gearbox 442 configured to transmit power provided by the electric motor 440 to the steering collar 415 and a clutch 444 connected to a clutch control valve 441 configured to engage and disengage the clutch 444. In various embodiments, the combination of the electric motor 440, the gearbox 442 and the clutch 444 comprises an electro-mechanical actuator 448 connected to the steering collar 415 and to a hydraulic pump 450.

The directional control valve 439 and the clutch control valve 441 are fluidly coupled to the hydraulic pump 450. In various embodiments, the hydraulic pump 450 comprises a check valve-type hydraulic pump, or similar pump, enabling an output flow from the fluid outlet 462 regardless of the direction the electric motor 440 is turning. Other pump types that do not have this characteristic are feasible but may require additional hydraulic valves to handle the bi-directional flow. In various embodiments, the hydraulic pump 450 is a variable delivery, pressure-compensated type pump that enables different configurations of the directional control valve 439 to be configured differently. In various embodiments, a second clutch may be added between the hydraulic pump 450 and the electric motor 440, thereby eliminating the need for a recirculation flow path or pressure compensated pump. The hydraulic pump 450 is mechanically connected to the electric motor 440 via a shaft 452 and is fluidly connected to the directional control valve 439 and to the clutch control valve 441 via a network of hydraulic lines 454. The network of hydraulic lines 454 includes a plurality of actuator hydraulic lines 456 that fluidly couple the directional control valve 439 to the retract actuator 434 and to the uplock actuator 438, a clutch hydraulic line 458 that fluidly couples the clutch control valve 441 to the clutch 444 and a recirculation hydraulic circuit 460 that fluidly couples a fluid outlet 462 to a fluid inlet 464 of the hydraulic pump 450 via the directional control valve 439. In various embodiments, the directional control valve 439 may be configured to control flow direction in addition to enabling the recirculation flow while steering. Also fluidly coupled to the network of hydraulic lines 454 is a first accumulator 466, a second accumulator 468 and a reservoir 465. In various embodiments, the network of hydraulic lines 454 also includes a plurality of auxiliary hydraulic lines 467 configured to fluidly couple the retract actuator 434 and the uplock actuator 438 to the second accumulator 468 via an auxiliary valve 469. The auxiliary hydraulic lines 467 in combination with the auxiliary valve 469 and the second accumulator 468 enable the nose landing gear assembly to be deployed in the event of a failure in the primary system.

Still referring to FIGS. 4A, 4B and 4C, a method of operating a nose landing gear system, such as the nose landing gear system 406, is described in accordance with various embodiments. During a first step (e.g., during a pre-flight start up step where the nose landing gear system 406 currently assumes an extended or deployed position, as illustrated in FIG. 4A), the electric motor 440 is turned on, allowing the hydraulic pump 450 to pressurize the first accumulator 466 and the second accumulator 468 via the network of hydraulic lines 454. During this step, the directional control valve 439 is switched to the extended or the deployed position (e.g., to the left, as illustrated), thereby enabling hydraulic fluid to flow to the retract actuator 434 and the uplock actuator 438. Similarly, the clutch control valve 441 is switched to an off position (e.g., to the left, as illustrated), thereby disengaging the clutch 444 and preventing the electric motor 440 from driving the steering collar 415 via the gearbox 442. Also during this step, a retract piston and rod assembly 471 that is part of the retract actuator 434 has previously been urged to the left (as illustrated) and has thereby previously urged a nose landing gear assembly, such as, for example, the nose landing gear assembly 216 described above with reference to FIG. 2, into the extended or the deployed position. At the same time, an uplock piston and rod assembly 473 that is part of the uplock actuator 438 has previously been urged to the left (as illustrated) and has thereby previously activated a sequence valve 475 upward (as illustrated) to an open position such that hydraulic fluid may flow to the retract actuator 434. In such configuration, hydraulic fluid flowing through the hydraulic pump 450 during the first step is blocked at the retract actuator 434 and at the uplock actuator 438, thereby forcing the hydraulic fluid to flow through a first check valve 476 into the first accumulator 466 and through a second check valve 478 into the second accumulator 468. During the first step, the hydraulic pump 450 is operated until a first pressure switch 477 in fluid communication with the first accumulator 466 and a second pressure switch 479 in fluid communication with the second accumulator 468 are switched upon a specified pressure in the respective accumulators being reached. Upon reaching the specified pressure in the accumulators, the electric motor 440 is turned off, thereby turning off the hydraulic pump 450. In various embodiments, pressure transducers (or similar devices) may be used in lieu of pressure switches.

During a second step (e.g., during taxi, followed by takeoff, where the nose landing gear system 406 remains in the extended or the deployed position, as illustrated in FIG. 4B), the directional control valve 439 is switched to a neutral position (e.g., to the middle, as illustrated), thereby providing a fluid return that enables the recirculation hydraulic circuit 460 to be established. The electric motor 440 is turned on, forcing hydraulic fluid to flow with minimal fluid restriction through the recirculation hydraulic circuit 460—e.g., hydraulic fluid is pumped with minimal fluid restriction from the fluid outlet 462 and to the fluid inlet 464 via the fluid return provided by the directional control valve 439. The specified pressure having been reached within the first accumulator 466 and the second accumulator 468 during the first step, the flow of hydraulic fluid is blocked at the first check valve 476 and the second check valve 478, respectively. During the second step, the clutch control valve 441 is switched to an on position (e.g., to the right, as illustrated), thereby engaging the clutch 444 and enabling the electric motor 440 to drive the steering collar 415 via the gearbox 442. As configured, during the second step, the electric motor 440 drives the steering collar 415 (e.g., clockwise or counterclockwise, depending on the direction of rotation of the electric motor 440) and, at the same time, remains coupled to and drives the hydraulic pump 450, though minimal power is lost driving the hydraulic pump 450 because of the minimal fluid restriction provided by the recirculation hydraulic circuit 460. During the takeoff portion of the second step, once a weight on nose gear ("WONG") signal is turned off during rotation of the aircraft (i.e., once the nose landing gear wheel has left the runway), the electric motor 440 is commanded to center the nose wheel and the clutch control valve 441 is de-energized and returned to its off position (e.g., as illustrated in FIG. 4A), thereby disengaging the clutch 444. In various embodiments, a clutch status switch 480 is configured to provide a status signal to the cockpit or to avionics systems to verify the clutch has been disengaged. At this time, the electric motor 440 may be turned off. In various embodiments, different sensing methods may be employed in lieu of the clutch status switch 480. Redundant clutch control valve and switch/sensor configurations may also be employed.

During a third step (e.g., during a gear up step, where the nose landing gear system 406 returns to a retracted or a stowed position from the extended or the deployed position, as illustrated in FIG. 4C), the electric motor 440 is turned on and the directional control valve 439 is switched to the retracted or the stowed position (e.g., to the right, as illustrated), thereby enabling hydraulic fluid to flow to the retract actuator 434. During the third step, the clutch control valve 441 remains in the off position (e.g., to the left, as illustrated), thereby disengaging the clutch 444 and preventing the electric motor 440 from driving the steering collar 415 via the gearbox 442 while allowing the electric motor 440 to drive the hydraulic pump 450. Also during this step, the retract piston 470 is urged to the right (as illustrated) urges the nose landing gear assembly into the retracted or the stowed position. At the same time, the uplock piston and rod assembly 473 has previously been urged to the right (as illustrated) by a bias member 482 (e.g., a coil spring) thereby releasing the sequence valve 475 to return downward (as illustrated) to a closed position such that hydraulic fluid may flow from the retract actuator 434 and to the fluid inlet 464 and the reservoir 465 via a third check valve 483 incorporated as part of the sequence valve 475. Once the nose landing gear assembly is confirmed in the retracted or stowed position and the first pressure switch 477 and the second pressure switch 479 indicate the specified pressure has been reached in the first accumulator 466 and the second accumulator 468, the electric motor 440 is turned off.

During a fourth step (e.g., during a cruise step, where the nose landing gear system 406 remains in the retracted or the stowed position as illustrated in FIG. 4C), the electric motor 440 is turned on and off (along with energizing the directional control valve 439 to the landing gear retraction or stowed position), periodically and as may be necessary, to ensure the specified pressure is maintained within the first accumulator 466 and the second accumulator 468. During a fifth step (e.g., during a landing approach step), the electric motor 440 is turned on and the directional control valve 439 is returned to the extended or the deployed position (e.g., to the left, as illustrated in FIG. 4A), thereby enabling hydraulic fluid to flow to the retract actuator 434 and the uplock actuator 438. The clutch control valve 441 remains in the off position (e.g., to the left, as illustrated in FIG. 4A), thereby disengaging the clutch 444 and preventing the electric motor 440 from driving the steering collar 415 via the gearbox 442. This enables the retract piston and rod assembly 471 to move back to the left (as illustrated in FIG. 4A) and returns the nose landing gear assembly to the extended or the deployed position. The electric motor 440 may then be turned off once a downlock indicator switch verifies the nose landing gear assembly has assumed the extended or the deployed position and a downlock actuator has been engaged. Finally, during a sixth step (e.g., during landing, followed by taxi, where the nose landing gear system 406 remains in the extended or the deployed position, as illustrated in FIG. 4B), once the WONG signal has been reestablished (indicating the aircraft has landed), the directional control valve 439, to the extent not previously done, is moved to the neutral position, thereby providing the fluid return that enables the recirculation hydraulic circuit 460 to be established, and the clutch control valve 441 is returned to the on position (e.g., to the right, as illustrated), thereby engaging the clutch 444 and enabling the electric motor 440 to drive the steering collar 415 via the gearbox 442. The electric motor 440 may then be turned back on to drive the steering collar 415. In various embodiments, the electric motor 440 may be turned on at the same time as the various valves are energized in order to facilitate pilot operation of the valves.

Figure 5:
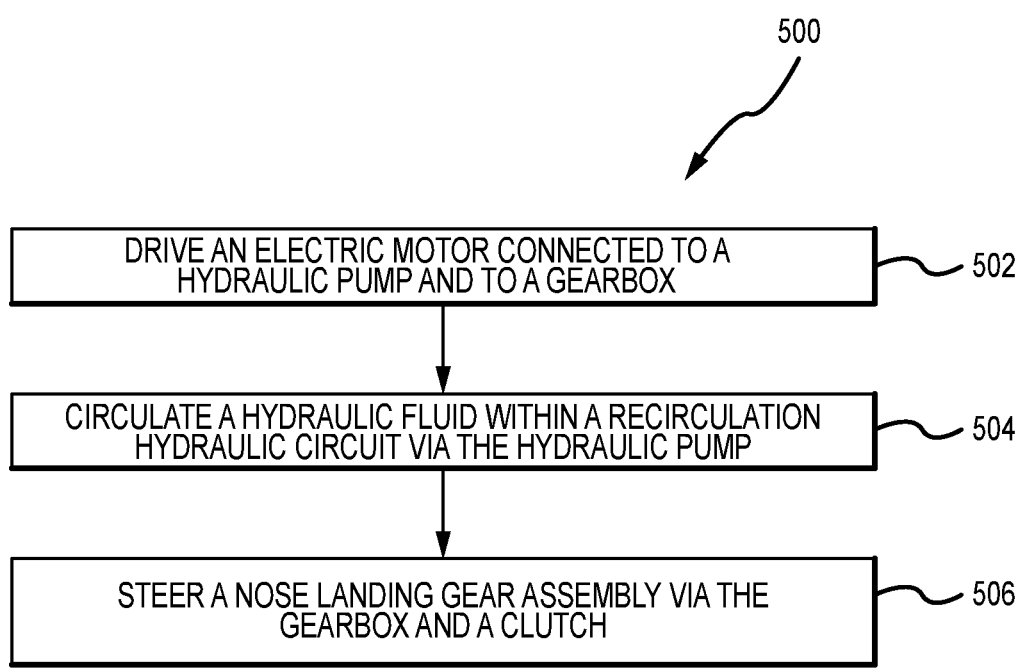
FIG. 5 illustrates a method of operating a nose landing gear system, in accordance with various embodiments.

Referring now to FIG. 5, a method 500 of operating a nose landing gear system is disclosed as comprising the following steps. In various embodiments, a first step 502 includes driving an electric motor connected to a hydraulic pump and to a gearbox. A second step 504 includes circulating a hydraulic fluid within a recirculation hydraulic circuit via the hydraulic pump. A third step 506 includes steering a nose landing gear assembly via the gearbox and an engaged clutch. In various embodiments, circulating the hydraulic fluid within the recirculation hydraulic circuit includes circulating the hydraulic fluid through a fluid return provided by a directional control valve in a neutral position. In various embodiments, the method 500 further includes pressurizing an accumulator to a specified pressure that is sufficient to engage or disengage a clutch mechanically coupled to the gearbox and to the steering collar of the nose landing gear assembly. In various embodiments, the method 500 further includes disengaging the clutch, switching the directional control valve to a stowed position and stowing the nose landing gear assembly via the hydraulic pump. In various embodiments, the method 500 further includes disengaging the clutch, switching the directional control valve to a deployed position and deploying the nose landing gear assembly via the hydraulic pump.

Figure 6:
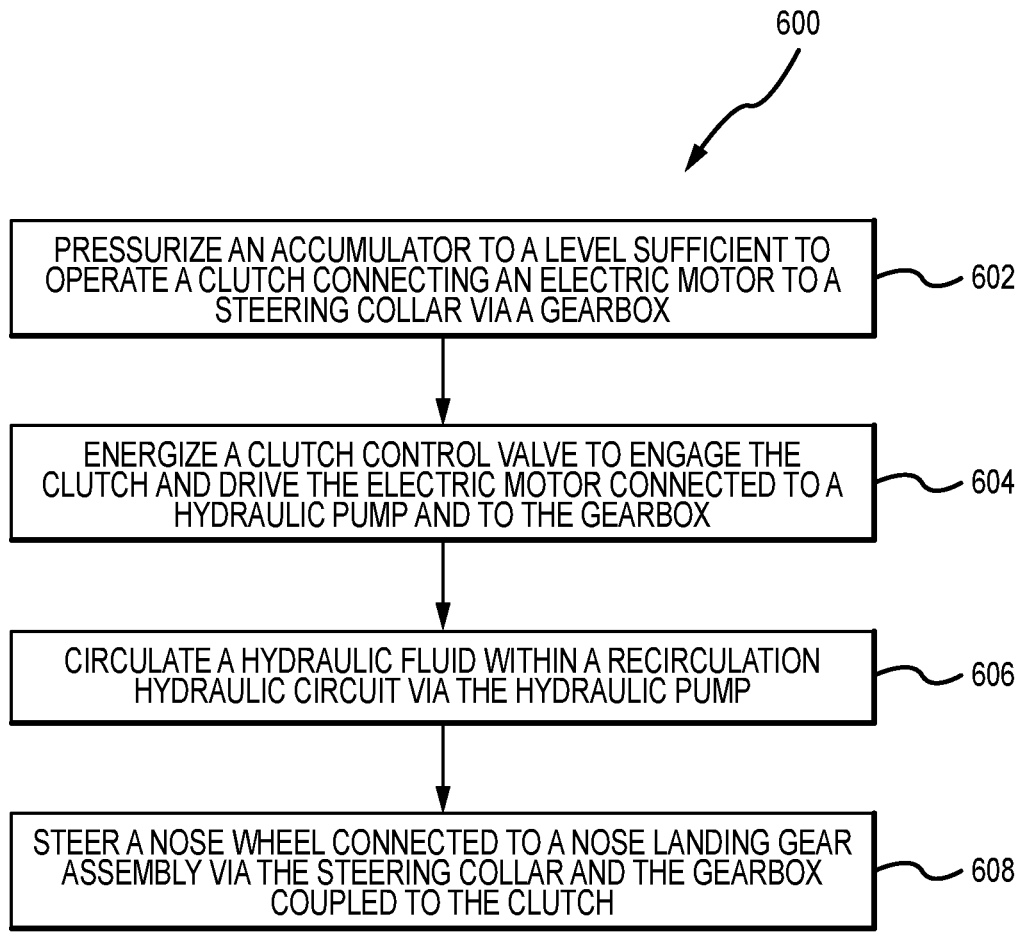
FIG. 6 illustrates a method of operating a nose landing gear system, in accordance with various embodiments.

Referring now to FIG. 6, a method 600 of steering an aircraft is described, in accordance with various embodiments and with reference to FIGS. 2, 4A, 4B and 4C. A first step 602 includes pressurizing an accumulator, which may comprise, for example, one or both of the first accumulator 466 and the second accumulator 468 described above with reference to FIGS. 4A-4C. The accumulators are pressurized by energizing the electric motor 440 which operates the pump and energizing the directional control valve 439 to the position commanded by the cockpit landing gear control level (for example, energized to deploy position when control lever is in landing gear down position). The electric motor 440 and directional control valve are de-energized once a specified pressure is reached. Once pressurized, the accumulators are re-pressurized as needed during aircraft operation to maintain a specified pressure sufficient to perform an alternate nose landing gear extension in the case of the second accumulator 468 and operate a clutch (e.g., the clutch 444) in the case of the first accumulator 466 connecting an electric motor (e.g., the electric motor 440) to a steering collar (e.g., the steering collar 415). A second step 604 includes energizing a clutch control valve (e.g., the clutch control valve 441) to engage the clutch and to drive the electric motor connected to a hydraulic pump (e.g., the hydraulic pump 450) and to a gearbox (e.g., the gearbox 442). A third step 606 includes circulating a hydraulic fluid within a recirculation hydraulic circuit (e.g., the recirculation hydraulic circuit 460 with directional control valve 439 in the neutral position) via the hydraulic pump. A fourth step 608 includes steering a nose wheel connected to a nose landing gear assembly (e.g., the nose landing gear assembly 216) via the steering collar 415 and the gearbox 442 coupled to the clutch 444.

Figure 7:
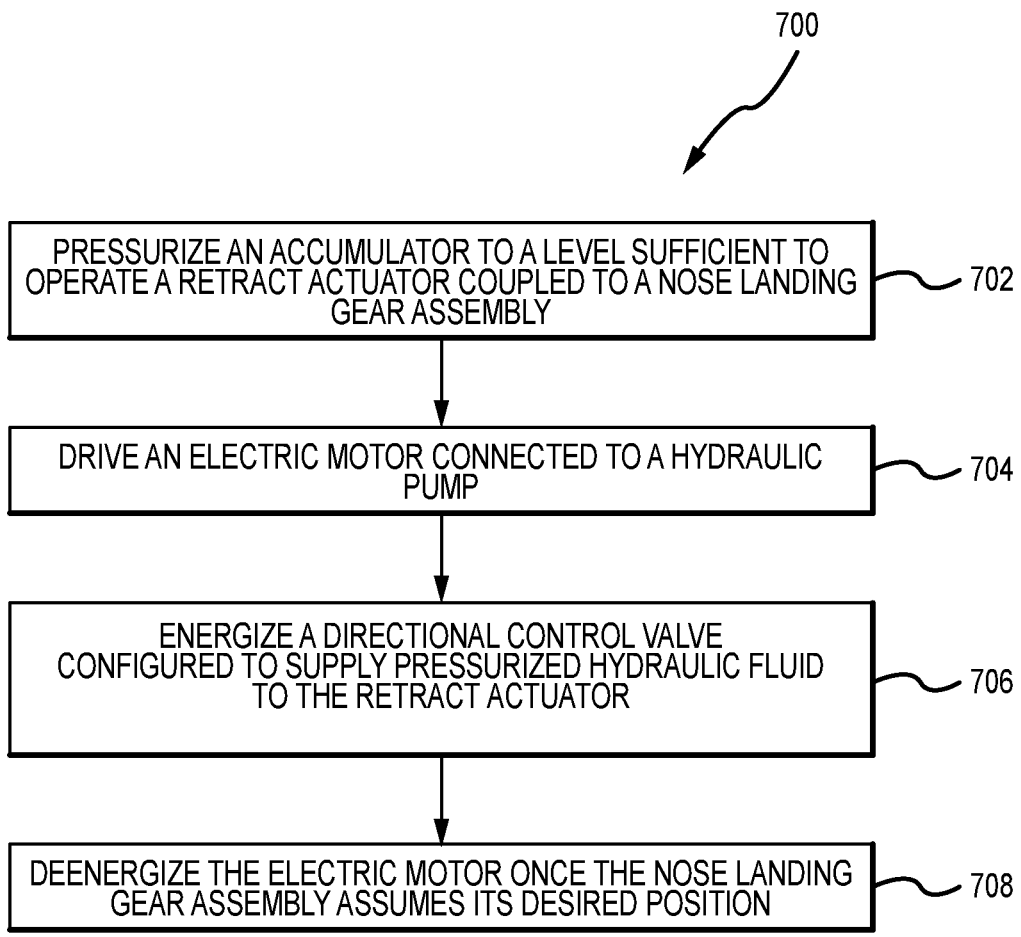
FIG. 7 illustrates a method of operating a nose landing gear system, in accordance with various embodiments.

Referring now to FIG. 7, a method 700 of retracting or extending a nose landing gear assembly is described, in accordance with various embodiments and with reference to FIGS. 2, 4A, 4B and 4C. A first step 702 includes pressurizing both accumulators, e.g., the first accumulator 466 and the second accumulator 468 described above with reference to FIGS. 4A-4C. Once pressurized, the accumulators are re-pressurized as needed during aircraft operation to maintain a specified pressure sufficient to operate the clutch 444 and a retract actuator (e.g., the retract actuator 434) coupled to a nose landing gear assembly (e.g., the nose landing gear assembly 216). A second step 704 includes driving an electric motor (e.g., the electric motor 440) connected to a hydraulic pump (e.g., the hydraulic pump 450) and to a gearbox (e.g., the gearbox 442). A third step 706 includes energizing a directional control valve (e.g., the directional control valve 439) configured to supply pressurized hydraulic fluid to the retract actuator and a return path to the reservoir 465. A fourth step 708 includes deenergizing the electric motor once the nose landing gear assembly assumes its commanded position.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to one embodiment, an embodiment, various embodiments, etc., indicate the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. A nose landing gear system, comprising:
   an electric motor;
   a unidirectional hydraulic pump connected to the electric motor and providing an output fluid flow from a fluid output of the unidirectional hydraulic pump regardless of a direction the electric motor is turning;
   a gearbox connected to the electric motor; and
   a clutch configured to mechanically couple the gearbox to a steering collar,
   wherein the unidirectional hydraulic pump is configured for connection with one or more of a retract actuator, an uplock actuator, a downlock actuator and a door actuator,
   wherein a directional control valve is fluidly coupled to the unidirectional hydraulic pump and to the one or more of the retract actuator, the uplock actuator, the downlock actuator and the door actuator and
   a recirculation hydraulic circuit that fluidly couples the fluid outlet of the unidirectional hydraulic pump to a fluid inlet of the unidirectional hydraulic pump through the directional control valve in a neutral position, wherein the directional control valve provides the recirculation hydraulic circuit when in the neutral position.

2. The nose landing gear system of claim 1, further comprising a clutch control valve configured to engage and disengage the clutch.

3. The nose landing gear system of claim 2, wherein the clutch control valve is fluidly coupled to an accumulator.

4. The nose landing gear system of claim 3, wherein the accumulator is configured to store hydraulic fluid at a specified pressure that is sufficient to engage or disengage the clutch.

5. The nose landing gear system of claim 4, wherein the clutch is disposed between the gearbox and the steering collar.

6. The nose landing gear system of claim 1, wherein the fluid outlet of the unidirectional hydraulic pump is fluidly coupled to a clutch control valve configured to engage and disengage the clutch and to the directional control valve.

7. A method of operating a nose landing gear system, comprising:
   driving an electric motor connected to a unidirectional hydraulic pump and to a gearbox wherein the unidirectional hydraulic pump provides an output fluid flow from a fluid output of the unidirectional hydraulic pump regardless of a direction the electric motor is turning;
   circulating, via the unidirectional hydraulic pump, a hydraulic fluid within a recirculation hydraulic circuit connecting the fluid output of the unidirectional hydraulic pump to a fluid inlet of the unidirectional hydraulic pump through a directional control valve in a neutral position; and
   steering a nose landing gear assembly via the gearbox and a clutch,
      wherein the unidirectional hydraulic pump is configured for connection with one or more of a retract actuator, an uplock actuator, a downlock actuator and a door actuator,
      wherein the directional control valve is fluidly coupled to the unidirectional hydraulic pump and to the one or more of the retract actuator, the uplock actuator, the downlock actuator and the door actuator and
      wherein the recirculation hydraulic circuit that connects the fluid output to the fluid inlet comprises the directional control valve in the neutral position.

8. The method of claim 7, wherein circulating the hydraulic fluid within the recirculation hydraulic circuit includes circulating the hydraulic fluid through a fluid return provided by the directional control valve in the neutral position.

9. The method of claim 8, further comprising pressurizing an accumulator to a specified pressure that is sufficient to engage or disengage the clutch, mechanically coupled to the gearbox and to the nose landing gear assembly via a steering collar.

10. The method of claim 9, further comprising disengaging the clutch, switching the directional control valve to a stowed position and stowing the nose landing gear assembly via the hydraulic pump.

11. The method of claim 9, further comprising disengaging the clutch, switching the directional control valve to a deployed position and deploying the nose landing gear assembly via the hydraulic pump.

12. The method of claim 7, wherein the nose landing gear assembly is mechanically coupled to the gearbox via the clutch.

13. The method of claim 12, wherein the clutch is fluidly coupled to an accumulator configured for pressurization via the hydraulic pump.

14. An electromechanical actuator for steering a nose landing gear system, comprising:
   an electric motor;
   a gearbox connected to the electric motor;
   a clutch configured to mechanically couple the gearbox to a steering collar; and
   a clutch control valve fluidly coupled to the clutch and configured to receive a pressurized hydraulic fluid from an accumulator to engage or disengage the clutch with or from the steering collar, wherein a unidirectional hydraulic pump provides an output fluid flow from a fluid output of the unidirectional hydraulic pump regardless of a direction that the electric motor is turning, wherein the unidirectional hydraulic pump connected to the electric motor is configured for connection with one or more of a retract actuator, an uplock actuator, a downlock actuator and a door actuator, wherein a directional control valve is fluidly coupled to the fluid output and a fluid input of the unidirectional hydraulic pump and to the one or more of the retract actuator, the uplock actuator, the downlock actuator and the door actuator and a recirculation hydraulic circuit that fluidly couples the fluid outlet of the unidirectional hydraulic pump to the fluid inlet of the unidirectional hydraulic pump through the directional control valve in a neutral position, wherein the directional control valve provides the recirculation hydraulic circuit when in the neutral position.

15. The electromechanical actuator of claim 14, wherein the unidirectional hydraulic pump is fluidly coupled with the accumulator.

16. The electromechanical actuator of claim 15, further comprising a check valve configured for fluid coupling with the fluid outlet of the unidirectional hydraulic pump.

* * * * *